(12) United States Patent  
Wong et al.

(10) Patent No.: US 6,529,654 B1
(45) Date of Patent: Mar. 4, 2003

(54) METHOD FOR TRANSPARENT SWITCHING AND CONTROLLING OPTICAL SIGNALS USING MIRROR DESIGNS

(75) Inventors: Richard Koonwai Wong, San Jose, CA (US); Edgar D. Sheh, San Jose, CA (US); Jenghung Chen, Cupertino, CA (US); Xiao Yang, Fremont, CA (US); Michael Barrett Wolfson, San Jose, CA (US)

(73) Assignee: Nayna Networks, Inc., Milpitas, CA (US)

( * ) Notice: Subject to any disclaimer, the term of this patent is extended or adjusted under 35 U.S.C. 154(b) by 112 days.

(21) Appl. No.: 09/847,868

(22) Filed: May 2, 2001

(51) Int. Cl.[7] ................................................. G02B 6/26
(52) U.S. Cl. ............................. 385/16; 385/17; 385/18
(58) Field of Search ............................. 385/16, 17, 18, 385/27

(56) References Cited

U.S. PATENT DOCUMENTS

| | | | |
|---|---|---|---|
| 4,317,611 A | 3/1982 | Petersen | 359/214 |
| 4,942,766 A | 7/1990 | Greenwood et al. | 73/704 |
| 5,488,862 A | 2/1996 | Neukermans et al. | 73/504.02 |
| 5,629,790 A | 5/1997 | Neukermans et al. | 359/198 |
| 5,648,618 A | 7/1997 | Neukermans et al. | 73/862.08 |
| 5,658,710 A | 8/1997 | Neukermans | 430/230 |
| 5,841,553 A | 11/1998 | Neukermans et al. | 358/494 |
| 5,861,549 A | 1/1999 | Neukermans et al. | 73/105 |
| 5,969,465 A | 10/1999 | Neukermans et al. | 310/333 |
| 6,064,779 A | 5/2000 | Neukermans et al. | 382/313 |
| 6,256,430 B1 * | 7/2001 | Jin et al. | 385/18 |
| 6,301,402 B1 * | 10/2001 | Bhalla et al. | 385/16 |

FOREIGN PATENT DOCUMENTS

| | | |
|---|---|---|
| WO | PCT/US99/20218 | 3/2000 |
| WO | PCT/US99/21139 | 4/2000 |

* cited by examiner

*Primary Examiner*—Robert H. Kim
*Assistant Examiner*—Therese Barber
(74) *Attorney, Agent, or Firm*—Townsend and Townsend and Crew LLP

(57) ABSTRACT

A method for switching signals using one of a plurality of mirrors in an array structure. The method includes determining an optical path to be formed between an input fiber and an output fiber. The method also includes determining a set of mirrors to be used to form the optical path. The set of mirrors includes at least a first mirror. The first mirror is coupled to a mechanical spring assembly and an actuation assembly. The method captures an analog signal indicative of a spatial position of the first mirror using a position sensing device. The sensing device is coupled to the mirror. The method also converts the signal analog signal into a digital signal. The method processes the digital signal indicative of the spatial position of the mirror using the digital signal processing device to obtain a characteristic of the mirror. The method provides a control signal based upon the characteristic of the mirror. The converts the control signal into an analog control signal. The method uses the analog control signal with the actuation assembly to set a desired position of the first mirror.

17 Claims, 8 Drawing Sheets

$$X(k+1) = AX(k) + Bu(k)$$
$$y(k) = CX(k)$$

METHOD FOR TRANSPARENT SWITCHING AND CONTROLLING OPTICAL SIGNALS USING MIRROR DESIGNS

CROSS-REFERENCES TO RELATED APPLICATIONS

The following applications including the present application are being filed concurrently. All of the application is hereby incorporated by reference to each other for all purposes.

1. U.S. Ser. No. 09/847,870, filed on May 2, 2001 entitled METHOD FOR OPERATING A MICRO-MIRROR ASSEMBLY FOR OPTICAL SWITCHING APPLICATIONS, commonly assigned, and hereby incorporated by reference for all purposes;
2. U.S. Ser. No. 09/847,868, filed on May 2, 2001 entitled METHOD FOR TRANSPARENT FOR SWITCHING AND CONTROLLING OPTICAL SIGNALS USING MIRROR DESIGNS, commonly assigned, and hereby incorporated by reference for all purposes;
3. U.S. Ser. No. 09/847,921, filed on May 2, 2001 entitled OPERATION OF HIGH DENSITY MEMS DEVICE USING DIGITAL SIGNAL PROCESSING, commonly assigned, and hereby incorporated by reference for all purposes; and
4. U.S. Ser. No. 09/847,890, filed on May 2, 2001 entitled SYSTEM AND COMPUTER CODE FOR OPERATING A MICRO-MIRROR ASSEMBLY FOR OPTICAL SWITCHING APPLICATIONS, commonly assigned, and hereby incorporated by reference for all purposes.

BACKGROUND OF THE INVENTION

This invention generally relates to techniques for operating and controlling an optical switch system. More particularly, the present invention provides a method for operating and controlling movement of a micro-mirror structure coupled to a pair of torsion bars in a transparent manner. Merely by way of example, the present invention is implemented on a micro-mirror assembly for switching an optical signal, but it would be recognized that the invention has a much broader range of applicability. The mirror can be used in a switching device for long haul communications. The invention can be applied to other types of networks including local area networks, enterprise networks, small switch designs (e.g., two by two) and the like.

As the need for faster communication networks becomes more desirable, digital telephone has progressed. Conventional analog voice telephone signals have been converted into digital signals. These signals can be 24,000 bits/second and greater in some applications. Other telephone circuits interleave these bit streams from 24 digitized phone lines into a single sequence of 1.5 Mbit/second, commonly called the T1 or DS1 rate. The T1 rate feeds into higher rates such as T2 and T3. A T4 may also be used. Single mode optical fibers have also been used at much higher speeds of data transfer. Here, optical switching networks have also been improved. An example of such optical switching standard is called the Synchronous Optical Network (SONET), which is a packet switching standard designed for telecommunications to use transmission capacity more efficiently than the conventional digital telephone hierarchy, which was noted above. SONET organizes data into 810-byte "frames" that include data on signal routing and designation as well as the signal itself. The frames can be switched individually without breaking the signal up into its components, but still require conventional switching devices.

Most of the conventional switching devices require the need to convert optical signals from a first source into electric signals for switching such optical signals over a communication network. Once the electric signals have been switched, they are converted back into optical signals for transmission over the network. As merely an example, a product called the SN 16000 is BroadLeaf™ Network Operating System (NOS) made by Sycamore Networks, Inc. uses such electrical switching technique. Numerous limitations exist with such conventional electrical switching technique. For example, such electrical switching often requires a lot of complex electronic devices, which make the device difficult to scale. Additionally, such electronic devices become prone to failure, thereby influencing a reliability of the network. The switch is also slow and is only as fast as the electrical devices. Accordingly, techniques for switching optical signals using a purely optical technology have been proposed. Such technology can use a wave guide approach for switching optical signals. Unfortunately, such technology has been difficult to scale for switching a high number of signals from a bundle of optical fibers, which may be desirable today. Other companies have also been attempting to develop technologies for switching such high number of signals, but have been unsuccessful. Such switches are also difficult to manufacture effectively and reliably. Other examples of optical switching networks include access, metropolitan and Dense Wavelength Division Multiplexing (DWDM) networks.

As merely an example, some companies have been attempting to use mirrors to switch an optical beam from one fiber to another. The use of mirrors in telecommunication signals has some advantages such as low signal loss and the like. Such mirrors, however, are often difficult to manufacture in a high density mirror array. In particular, such mirrors are often fragile and prone to damage during fabrication. U.S. Pat. No. 5,969,465, assigned to XROS, Inc. describes such a mirror, which is often difficult to make and operate high density array structures. Such mirrors can often only operate in a linear region through electrostatic force. Such linear region generally provides a limited amount of movement of the mirror through a spatial region, which limits its switching effectiveness. Accordingly, it is often difficult to use such a mirror design to operate high density arrays.

From the above, it is seen that an improved way for operating movement of a mirror assembly for switching a signal is highly desirable.

SUMMARY OF THE INVENTION

According to the present invention, a technique including a method and apparatus for operating and controlling a switch system is provided. More particularly, the present invention provides a method for operating and controlling movement of a micro-mirror structure coupled to a pair of torsion bars in a transparent manner. Merely by way of example, the present invention is implemented on a micro-mirror assembly for switching an optical signal, but it would be recognized that the invention has a much broader range of applicability. The mirror can be used in a switching device for long haul communications. The invention can be applied to other types of networks including local area networks, enterprise networks, small switch designs (e.g., two by two) and the like.

In a specific embodiment, the invention provides a method for switching signals using one of a plurality of mirrors in an array structure. The method includes determining an optical path to be formed between an input fiber and an output fiber. method also includes determining a set of mirrors to be used to form the optical path. The set of mirrors includes at least a first mirror. The first mirror is coupled to a mechanical spring assembly and an actuation assembly. The method captures an analog signal indicative of a spatial position of the first mirror using a position sensing device. The sensing device is coupled to the mirror. The method also converts the signal analog signal into a digital signal. The method processes the digital signal indicative of the spatial position of the mirror using the digital signal processing device to obtain a characteristic of the mirror. The method provides a control signal based upon the characteristic of the mirror. The converts the control signal into an analog control signal. The method uses the analog control signal with the actuation assembly to set a desired position of the first mirror.

In an alternative specific embodiment, the invention provides a system for controlling and switching optical signals using selection of optical paths from a first fiber bundle to a second fiber bundle in a transparent manner. The system has a client device including a graphical user interface for input of switching information by a user. The client device is substantially free from interaction by the user to optimize an optical path. A network is coupled to the client device for receiving the switching information. A switch control apparatus is coupled to the network and a switch device is coupled to the switch control apparatus. The switch device has a fiber input device and a set of mirrors from a plurality of mirrors coupled to the fiber input device. The set of mirrors include at least a first mirror that is capable of being moved about a mechanical spring. The first mirror is coupled to the mechanical spring device to form a counter-acting force to the mirror in a first direction. A sensing is device coupled to the first mirror. The sensing device is adapted to capture position information from the first mirror. An analog to digital converter device is coupled to the sensing device. Such digital to analog converter device converts the position information into a digital signal. A signal processing device is coupled to the analog to digital converter. The digital signal processing device processes the digital signal to derive a digital control signal based upon a characteristic of the first mirror device. The device also has a digital to analog converter device coupled to the signal processing device. The digital to analog converter device is adapted to convert the digital control signal to an analog control signal. The device has an actuation device coupled to the first mirror and coupled to the digital to analog converter. The actuation device receives a signal derived from the analog control signal to drive the mirror about the mechanical spring using the analog control signal to set a desired position of the first mirror.

Many benefits are achieved by way of the present invention over conventional techniques. For example, the present technique provides an easy to use process that relies upon conventional technology. The present invention provides a novel way of controlling and operating a MOEMS, which can include a micro-mirror assembly. In one aspect, the invention allows for high scale integration of mirror devices to form high density and performance switching devices. Such switching device can include more than 10 (ten) mirror elements. In some embodiments, such switching devices can include more than 200 (two hundred) or even thousands (one thousand to four thousand and greater) mirror elements for switching respective signals for optical switching applications. The invention also provides for a stable switch position during operation for a MOEMS, which may be subjected to internal and/or external noise from a mechanical (e.g., vibration, shock), thermal, gravitational or electrical force or forces. Such forces can be detrimental to precise switching requirements of the MOEMS for optical switching applications in the telephone industry. The present feed back control can also provide for stable operation that may be related to drift caused by electrical, mechanical, and/or thermal. The invention can also take into account degradations over a lifetime of a switching device, which may be prone to fatigue or the like. In preferred embodiments, the present system has stable operating performance (e.g., low bit error rates, low dB losses, low insertion losses) due to the feed back process. The present control system can be used to reduce switching time (e.g., less than 20 milliseconds) as compared to conventional open loop configurations, which often oscillate and cannot find a stable position efficiently. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

According to the present invention, a technique including a method and apparatus for operating and controlling a switch system is provided. More particularly, the present invention provides a method for operating and controlling movement of a micro-mirror structure coupled to a pair of torsion bars in a transparent manner. Merely by way of example, the present invention is implemented on a micro-mirror assembly for switching an optical signal, but it would be recognized that the invention has a much broader range of applicability. The mirror can be used in a switching device for long haul communications. The invention can be applied to other types of networks including local area networks, enterprise networks, small switch designs (e.g., two by two) and the like.

Figure 1:
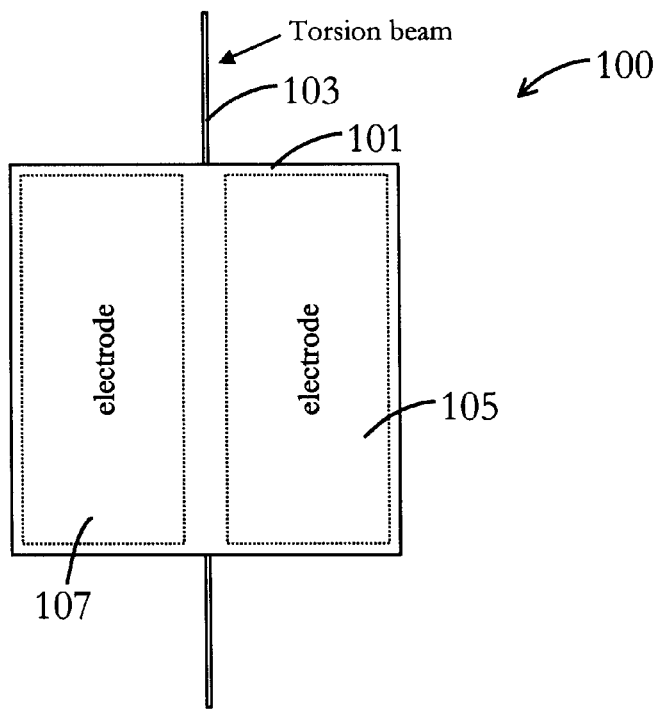
FIG. 1 is a simplified block diagram of a system according to an embodiment of the present invention.

FIG. 1 is a simplified block diagram of a system 100 according to an embodiment of the present invention. This diagram is merely an illustration and should not unduly limit the scope of the invention defined by the claims herein. One of ordinary skill in the art would recognize many other variations, alternatives, and modifications. As shown, FIG. 1 illustrates a top view diagram 100 of a mirror assembly. The assembly 100 includes a mirror surface structure 101 coupled between two torsion bars 103. The mirror surface structure can be made of a variety of materials including silicon, for example. The surface may also be coated with a reflective material. The reflective material can include gold and other suitable materials. Other materials include aluminum, nickel, and other suitable metals or semiconductors. In a specific embodiment, the substrate is made using the technique described in U.S. Ser. No. 60/270,404, filed on Feb. 20, 2001, commonly assigned and hereby incorporated by reference for all purposes. Underlying the mirror structure is a pair of electrodes, 105, 107. The electrodes are spatially disposed along each side of the mirror and each side of the torsion bar. The electrodes are subjected to a voltage or voltages, which move the mirror in a pivotal fashion along the torsion bar. Further details of such a mirror movement can be found throughout the present specification and more particularly below. Although the present specification is described in terms of a specific mirror structure, it should be noted that the mirror and electrode configuration can vary depending upon the embodiment.

Figure 2:
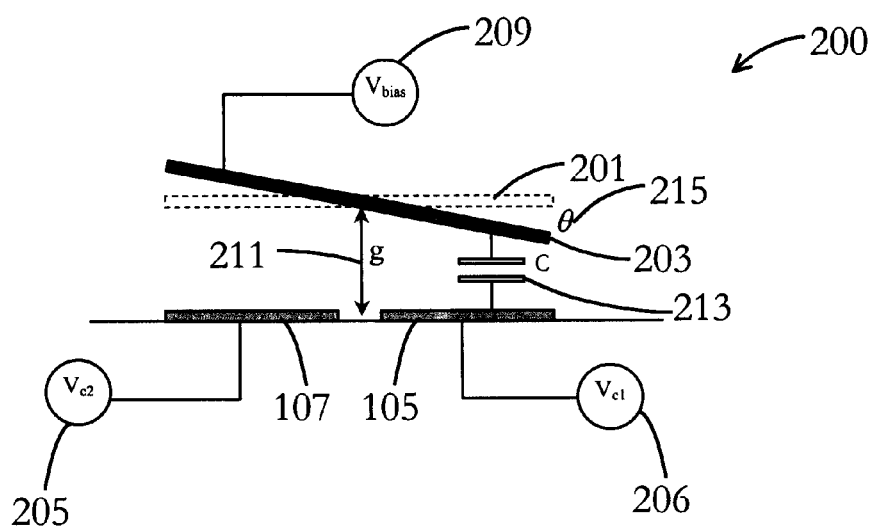
FIG. 2 is a simplified top-view diagram of a system according to an embodiment of the present invention.

FIG. 2 is a simplified diagram of a system 200 according to an embodiment of the present invention. This diagram is merely an illustration and should not unduly limit the scope of the invention defined by the claims herein. One of ordinary skill in the art would recognize many other variations, alternatives, and modifications. As shown, the drive electrodes 105, 107 are disposed on a substrate. A first applied voltage 206 is applied to electrode 105. A second applied voltage 205 is applied to electrode 107. A bias 209 is also applied, which reduces overall drive voltage. Such applied voltages are controlled through a controller (not shown). The mirror pivots about the torsion bar and moves from a normal position 201, through angle theta 215, to a desired switching position 203. The desired switching position can be located at an unstable region such as a pull-in region of conventional open loop circuits. Here, the mirror pivots through a stable region and an unstable region to the unstable position. The stable region is characterized where the spring force from the torsion bar can off set or is equal to the driving force from the electrode. The unstable region is characterized with the spring force from the torsion bar being less than the driving force from the electrode. The spring force cannot off set the driving force, which causes the mirror to pull in and to deflect toward the mechanical stop and hit it in an uncontrollable manner, for example, which is detrimental to an operation for switching optical signals. A position of the mirror can be monitored by way of a sensor. In a specific embodiment, the sensor can be a capacitance sensor 213, which is coupled between the mirror and the electrodes or other substrate structure. In other embodiments, the sensor can also be any type of device that provides position information of the mirror. Such sensor can be mechanical, electrical, optical, any combination of these and the like. A relationship between mirror position and applied drive voltage can be found in more detail below.

Figure 3:
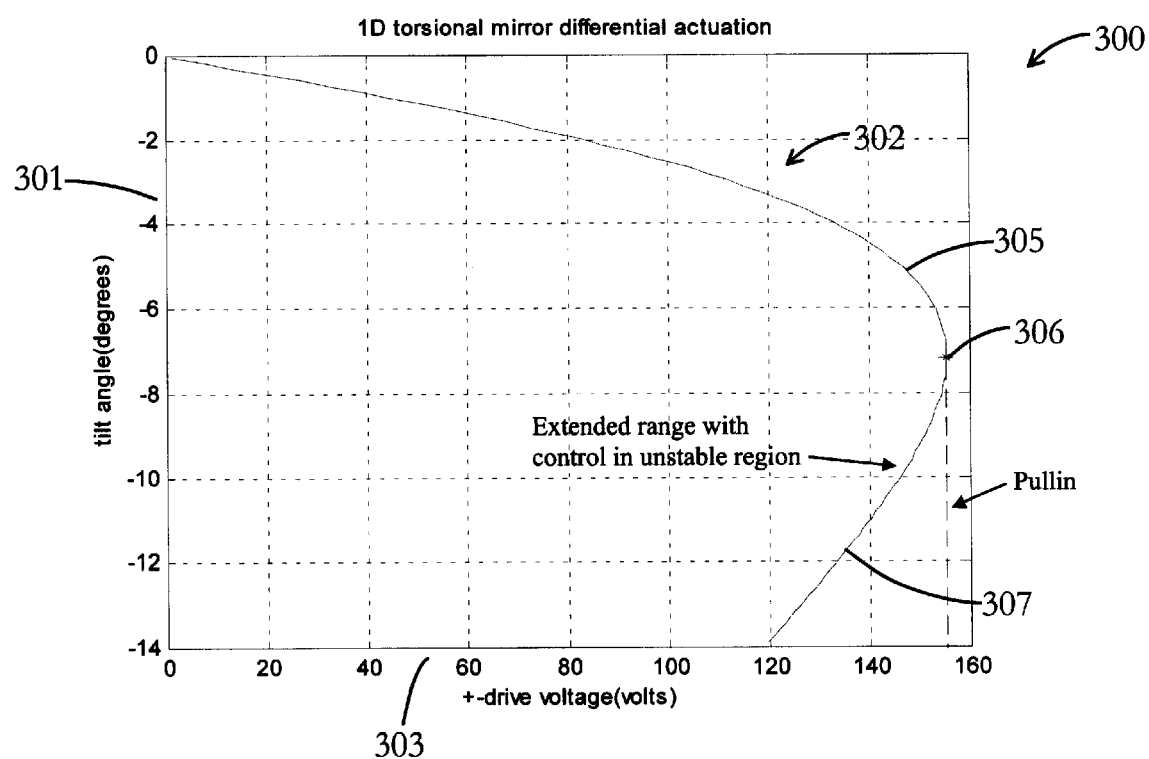
FIG. 3 is a simplified block diagram illustrating further details according to an embodiment of the present invention.

FIG. 3 is a simplified block diagram 300 illustrating more details of the system 300 of FIG. 1 according to an embodiment of the present invention. This diagram is merely an illustration and should not unduly limit the scope of the invention defined by the claims herein. One of ordinary skill in the art would recognize many other variations, alternatives, and modifications. To illustrate the mirror position through the stable region an unstable region, we have prepared the simplified diagram 300. As shown, the vertical axis represents tilt angle in degrees. The tilt angle varies from zero, which is the normal position, to −14 degrees, which is the desired switching position (from a number of such switching positions) in the unstable region. The horizontal axis represents drive voltage, which ranges from zero to 160 Volts. The diagram 302 includes a stable region, which extends from 0 degree at zero Volt to about a −7 degrees at 160 Volts. The point illustrated by reference numeral 306 represents an inflection point. After such inflection point, the operating range of the mirror becomes unstable, which is defined by the angles greater than −7 degrees. Such an unstable region is also defined as the pull-in region. In the pull-in region, the amount of voltage necessary to pivot the mirror decreases from the smaller gap between the drive electrodes and the mirrors, which increases the electrostatic force.

The above figure describes aspects of the invention illustrated by elements in simplified system diagrams. As will be understood by one of ordinary skill in the art, the elements can be implemented in computer hardware. The elements can also be implemented, in part, through computer software or firmware. Alternatively, the elements can be implemented in a combination of computer hardware and software. Some of the elements may be integrated with other software and/or hardware. Alternatively, some of the elements may be combined together or even separated. Additionally, discrete digital and/or analog components can also be used. These and other variations, modifications, and alternatives will be apparent by one of ordinary skill in the art. Further details of methods according to embodiments of the present invention can be found throughout the present specification and more particularly below.

A simplified method according to the present invention may be outlined as follows:

1. Set mirror, which is coupled to a control block, to first angular position;
2. Determine first angular position from a sensor coupled to the mirror;
3. Provide signal from a user interface to set mirror to second angular position, which is different from the first angular position;
4. Determine error between the first angular position and the second angular position;
5. Transfer error into the control block;
6. Form signal from control block to provide movement of the mirror to the second angular position;
7. Generate voltage from the signal to move the mirror from the first angular position to the second angular position;
8. Repeat the above steps to correct in any difference between the actual mirror position and the desired second angular position; and
9. Perform other steps, as desired.

The above sequence of steps provides a way of overseeing and controlling a micro-mirror device. Such steps include using feedback control from a position sensor coupled to the mirror device for controlling the mirror through stable and unstable operating regions. By way of the feedback, it is possible to operate the mirror through a much wider range of angles, which allows for more efficiency in switching and the like. Preferably, the mirror operates through a much wider range of angles than a conventional open loop configuration. Further details of the above steps are provided more fully throughout the specification and more particularly below.

Figure 4:
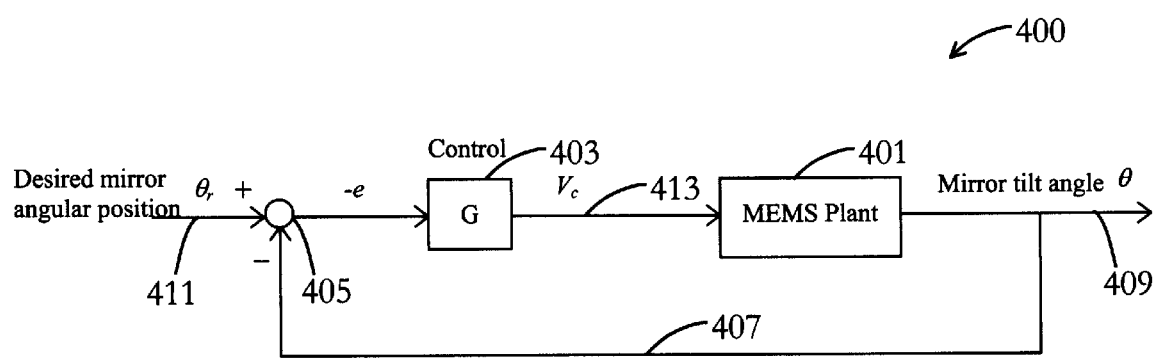
FIG. 4 is a simplified high level control diagram according to an embodiment of the present invention.

FIG. 4 is a simplified high level control diagram 400 according to an embodiment of the present invention. This diagram is merely an illustration and should not unduly limit the scope of the invention defined by the claims herein. One of ordinary skill in the art would recognize many other variations, alternatives, and modifications. As shown, the control diagram 400 includes a variety of elements such as a MEMS plant 401. The MEMS plant can include a micromirror assembly, such as the one described above, but can also be others. For example, the assembly includes a mirror surface structure coupled between two torsion bars. The mirror surface structure can be made of a variety of materials including silicon, for example. The surface may also be coated with a reflective material. The reflective material can include gold, aluminum, or other suitable reflective materials. Underlying the mirror structure is a pair of electrodes. Here, the term "underlying" does not have a specific reference to a direction of a gravity force. The electrodes are spatially disposed along each side of the mirror and each side of the torsion bar. The electrodes are subjected to a voltage or voltages, which move the mirror in a pivotal fashion along the torsion bar via the electrostatic force. Alternatively, the mirror structure can be adjacent to or merely coupled to electrodes.

In a specific embodiment, the drive electrodes are disposed on a substrate. A first applied voltage is applied to the first electrode. A second applied voltage is applied to a second electrode. Such applied voltages are controlled through a controller. The mirror pivots about the torsion bar and moves from a normal position, through angle theta, to a desired switching position. The desired switching position can be located at an unstable position, but can also be in a stable position. Here, the mirror pivots through a stable region and through an unstable region to a position within the unstable region. The stable region is characterized where the spring force from the torsion bar can off set or is equal to the driving force from the electrode. The unstable region is characterized with the spring force from the torsion bar being less than the driving force from the electrode. The spring force cannot off set the driving force, which causes the mirror to pull in and to deflect toward the mechanical stop and hit it in an uncontrollable manner, for example, which is detrimental to an operation for switching optical signals. A position of the mirror can be monitored by way of a sensor, which is coupled to a voltage bias. The MEMS plant is coupled to a feedback loop 407, which includes control block 403. The control block couples to the MEMS plant through line 413. A desired mirror set point in angular coordinates can be provided to the control block through line 411. Tilt angle can be outputted through line 409. In a specific embodiment, the present invention includes a method, which is carried out using the subject control diagram. Specific details with regard to a method according to an embodiment of the present invention are provided below.

The method sets the mirror position. The mirror is coupled to a control block that will be used to provide control to the mirror. The mirror is first set to a first angular position, which may be almost any starting position, including an intermediate position. The method determines the first angular position from a sensor coupled to the mirror. Such sensor has been described above. The first angular position is obtained from the sensor and is often fed into a controller or the like or other output device.

Next, the method provides a signal 411 from a user interface coupled to the controller to set the mirror to second angular position, which is different from the first angular position. In a specific embodiment, the user interface can be implemented in a manual, semi-automatic, or automatic switching configuration, which indicates switching a signal using the mirror at the first angular position to the second angular position. The method determines an error between the first angular position and the second angular position. Preferably, the error is the difference between the present position and the target position, which are respectively the first and second angular positions. Next, the method transfers the error into the control block 403. The control block forms an output signal to provide physical movement of the mirror to the second angular position.

In a specific embodiment, the control block generates a signal to generate a selected voltage, which has a corresponding magnitude. The selected voltage is applied to one or more of the electrodes coupled to the mirror. Such electrodes provide an electrostatic force or forces that move the mirror from the first angular position to the second angular position. Off setting some of the force would be a counter force provided by the spring force of the torsion bars, which couple the mirror device. The spring force varies as the mirror moves through the stable region and through the unstable region, as shown above. The method then repeats one or more of the above steps to correct in any difference between the actual mirror position and the desired second angular position.

The above figures describe aspects of the invention illustrated by elements in simplified system diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware. Alternatively, some of the elements may be combined together or even separated. Additionally, discrete digital and/or analog components can also be used. These and other variations, modifications, and alternatives will be apparent by one of ordinary skill in the art. Further details of methods according to embodiments of the present invention can be found throughout the present specification and more particularly below.

A simplified method according to an alternative embodiment of the present invention may be outlined as follows:

1. Set mirror device to first angular position (e.g., present position);
2. Determine first angular position from a sensor coupled to the mirror;
3. Provide signal from a user interface to set mirror to second angular position (e.g., target position), which is different from the first angular position;
4. Determine error between the first angular position and the second angular position;
5. Feed error into a digital signal processing module, which is running an algorithm;
6. Determine a digital output value based upon the algorithm in the digital signal processing module;
7. Convert the digital output value into an analog signal;
8. Amplify the analog signal, which will be used to drive the electrode or electrodes coupled to the mirror;
9. Apply voltage to the electrodes based upon the analog signal;
10. Move mirror based upon applied voltage toward desired position;

11. Monitor position of the mirror using analog signals from sensing device as it moves toward the desired position;
12. Convert analog signals from the sensing device;
13. Process analog signals from the sensing device;
14. Convert analog signals into digital signals;
15. Repeat the above steps to correct in any difference between the actual mirror position and the desired angular position; and
16. Perform other steps, as desired.

The above sequence of steps provides a way of overseeing and controlling a micro-mirror device. Such steps include using feedback control from a position sensor coupled to the mirror device for controlling the mirror through stable and unstable operating regions. The steps also provide for signal processing to allow for efficient and stable operating of the mirror device. By way of the feedback and signal processing, it is possible to operate the mirror through a much wider range of angles, which allow for more efficiency in switching and the like. Preferably, the mirror operates through a much wider range of angles than a conventional open loop configuration. Further details of the above steps are provided more fully throughout the specification and more particularly below.

Figure 5:
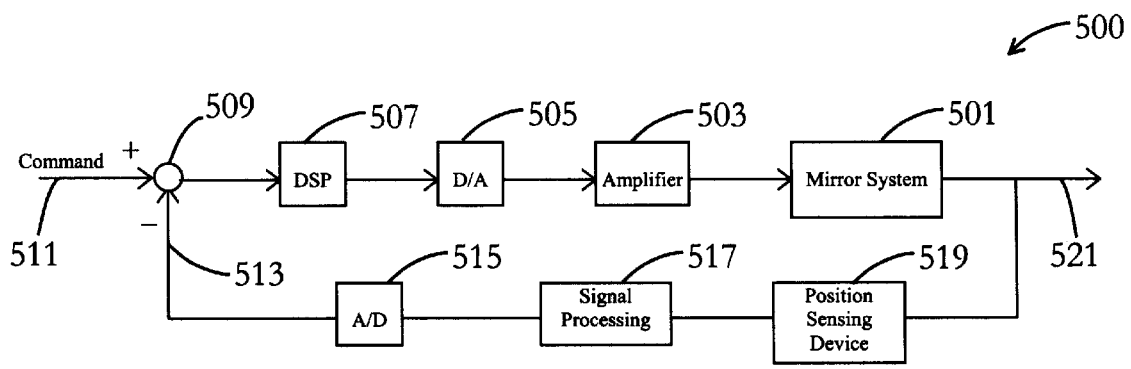
FIG. 5 is a simplified diagram of a feedback control diagram according to an embodiment of the present invention.

FIG. 5 is a simplified diagram of a feedback control diagram 500 according to an embodiment of the present invention. This diagram is merely an illustration and should not unduly limit the scope of the invention defined by the claims herein. One of ordinary skill in the art would recognize many other variations, alternatives, and modifications. As shown, the control diagram 500 includes a variety of elements. Such elements include, among others, a MEMS plant 501, which has an output 521. The MEMS plant includes a mirror device, such as the one above, but can be others. The output loops back into a position-sensing device 519, which is coupled to a signal-processing device 517. The signal-processing device sends analog signals to a converter 515. The converter is an analog to digital converter. The digital signal is fed back into an adder 509 via branch 513. Adder 509 is adapted to receive command signal 511. The difference or error is calculated with the digital signal-processing device 507, which couples to a digital to analog converter 505. The digital signal from the processing device is converted into an analog signal, which is then amplified through amplifier 503. The final analog signal is used to drive electrode devices in the MEMS plant.

As noted The MEMS plant can include a micro-mirror assembly, such as the one described above, but can also be others. For example, the assembly includes a mirror surface structure coupled between two torsion bars. The mirror surface structure can be made of a variety of materials including silicon, for example. The surface may also be coated with a reflective material. The reflective material can include gold and other suitable materials. Underlying the mirror structure is a pair of electrodes. The electrodes are spatially disposed along each side of the mirror and each side of the torsion bar. The electrodes are subjected to a voltage or voltages, which move the mirror in a pivotal fashion along the torsion bar.

In a specific embodiment, the drive electrodes are disposed on a substrate. A first applied voltage is applied to the first electrode. A second applied voltage is applied to a second electrode. Such applied voltages are controlled through a controller. The mirror pivots about the torsion bar and moves from a normal position, through angle theta, to a desired switching position. The desired switching position can be located at an unstable position, but can also be in a stable position. Here, the mirror pivots to a stable region and an unstable region to the unstable position. The stable region is characterized where the spring force from the torsion bar can off set or is equal to the driving force from the electrode. The unstable region is characterized with the spring force from the torsion bar being less than the driving force from the electrode. The spring force cannot off set the driving force, which causes the mirror to pull in and to deflect toward the mechanical stop and hit it in an uncontrollable manner, for example, which is detrimental to an operation for switching optical signals. A position of the mirror can be monitored by way of a sensor, which is coupled to a voltage bias. The MEMS plant is coupled to a feedback loop, which includes a control block. The control block couples to the MEMS plant. A desired mirror set point in angular coordinates can be provided to the control block. Tilt angle can be outputted. In a specific embodiment, the present invention includes a method, which is carried out using the subject control diagram. Specific details with regard to a method in the control block according to an embodiment of the present invention are provided below.

In a specific embodiment, the method first sets a mirror device to first angular position. The mirror is first set to a first angular position, which may be almost any starting position, including an intermediate position. The method determines the first angular position from a sensor coupled to the mirror. Such sensor has been described above. The first angular position is obtained from the sensor and is often fed into a controller or the like or other output device.

Next, the method provides a signal 511 from a user interface coupled to the controller to set the mirror to second angular position, which is different from the first angular position. In a specific embodiment, the user interface can be implemented in a manual, semi-automatic, or automatic switching configuration, which indicates switching a signal using the mirror at the first angular position to the second angular position. The method determines an error between the first angular position and the second angular position.

The error is fed from the adder 509 into a digital signal processing module, which is running an algorithm. An example of a control algorithm is provided more fully below, but is not limited. The method determines a digital output value based upon the algorithm in the digital signal processing module. The digital output value is converted into an analog signal in the digital to analog converter 505. The analog signal is amplified in amplifier 503. The amplified signal will be used to drive the electrode or electrodes coupled to the mirror. The amplified signal includes a voltage, which is applied to the one or more electrodes in the MEMS plant 501. The MEMS plant has the mirror, which couples to the one or more electrodes.

The mirror moves or pivots based upon the applied voltage toward a desired position. The position of the mirror is monitored using analog control signals from sensing device 519 as it moves toward the desired position. The analog signals from the sensing device are processed in a predetermined manner. Such signal processing occurs in the signal processing device 517. Next, the processed analog signals are converted into digital signals using the analog to digital converter 515. Such digital signals are transferred into the adder 509 via branch 513. The adder determines any difference between the actual mirror position and the desired angular position and goes through the above steps to correct for any difference.

The above figure describes aspects of the invention illustrated by elements in simplified system diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware. Alternatively, some of the elements may be combined together or even separated. Additionally, discrete digital and/or analog components can also be used. These and other variations, modifications, and alternatives will be apparent by one of ordinary skill in the art. Further details of methods according to embodiments of the present invention can be found throughout the present specification and more particularly below.

A method for providing feedback control for operating the mirror device is provided as follows:

1. Capture position information (y) from plant including mirror device using sensing device;
2. Feed position information (y) into current observer block;
3. Subtract position information (y) from predicted position value (C ×x[k]) to form temporary difference;
4. Multiply temporary difference with a second constant (L);
5. Add to predicted value x[k] to form current observer value X[k];
6. Form prediction of next state based upon current observer value X[k];
7. Multiply third constant (A) with the current observer value to form current observer temporary value;
8. Multiply fourth constant (B) with control input K and current observer value X[k] to form control temporary value;
9. Sum current observer temporary value with control temporary value;
10. Determine prediction value x[k+1] based upon the sum of the current observer temporary value and the control temporary value;
11. Determine next x[k] with a time shifting element $Z^{-1}$;
12. Feed back control temporary value to plant P; and
13. Perform other steps, as desired.

The above sequence of steps provides a way of overseeing and controlling a micro-mirror device. Such steps include using feedback control from a position sensor coupled to the mirror device for controlling the mirror through stable and unstable operating regions. The present steps provide a way of using at least proportional control (K) as a way of providing feedback to a mirror device operating in an unstable region. By way of the feedback, it is possible to operate the mirror through a much wider range of angles, which allows for more efficiency in switching and the like. Further details of the above steps are provided more fully throughout the specification and more particularly below.

Figure 6:
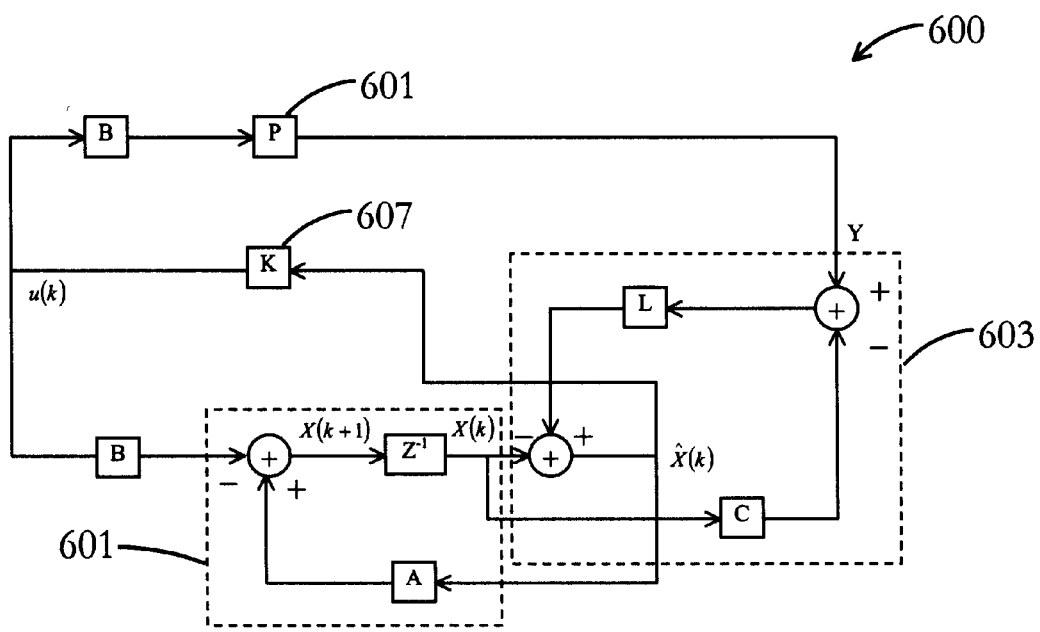
FIG. 6 is a detailed diagram of the control diagram of according to an embodiment of the present invention.

FIG. 6 is a detailed diagram of the control diagram 600 of according to an embodiment of the present invention. This diagram is merely an illustration and should not unduly limit the scope of the invention defined by the claims herein. One of ordinary skill in the art would recognize many other variations, alternatives, and modifications. As shown, the control diagram includes a MEMS plant 601, which is coupled to a current observer portion 603 and a prediction portion 605. The diagram also includes a control 607 portion, which couples to the MEMS plant, the current observer portion, and the prediction portion. The current observer portion can be described using the following relationship:

$$X[k]=x[k]+L\{y-(C\times x[k])\}$$

where

X[k] is a vector representation for a current observer value;

x[k] is a vector for a predicted value;

L is a vector for constant values;

y is position information; and

C is a vector for constant values.

As shown, the current observer value is equal to the predicted value plus constant L times the difference between the position information and constant times the predicted value. Such current observer value is illustrated by way of reference numeral 603. The prediction portion defined as x[k+1] is defined as follows:

$$x[k+1]=AX[k]+Bu[k]u[k]=KX[k]$$

where x[k+1] is a vector for a prediction portion;

A is a matrix of constants;

B is a vector of constants;

X[k] is a vector representation that defines the current observer value;

K is a vector for proportional gain; and u[k] is the feedback value.

As shown, the prediction portion is equal to A times the current observer value and B times u[k], which is the feedback value. The feedback value is fed back into the MEMS plant P for control. A method according to the present invention using the system can be described more fully below.

In a specific embodiment, the method captures position information y from plant including mirror device using sensing device. The method feeds the position information y into current observer block, which has been defined above. The method subtracts the position information y from predicted position value (C×x[k]) to form temporary difference. The temporary difference is multiplied with a second constant L. Next, the method adds the predicted value x[k] to form current observer value X[k]. The prediction of the next state is based upon the current observer value X[k].

Next, the method multiplies a third constant A with the current observer value to form current observer temporary value. The method multiplies a fourth constant B with control input K and current observer value X[k] to form control temporary value. The method sums the current observer temporary value with control temporary value. Next, the method determines a prediction value x[k+1] based upon the sum of the current observer temporary value and the control temporary value and determines the next x[k] with a time shifting element $Z^{-1}$. Feedback of the control temporary value is provided to the MEMS plant, P. These steps are repeated to control any deviation in the mirror from its position or control the mirror position to a predetermined value. Depending upon the embodiment, these steps can be integrated, replaced with other steps, combined, expanding, or any combination of these according to one of ordinary skill in the art. Additionally the above example has been implemented using observer based regulated control. It would be recognized that there could also be other ways to implement control. Such ways would include proportional integral and differential control, commonly called PID control. Of course, one of ordinary skill in the art would be able to find other modifications, alternatives, and variations.

Additionally, the above figure describes aspects of the invention illustrated by elements in simplified system diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware. Alternatively, some of the elements may be combined together or even separated. Additionally, discrete digital and/or analog components can also be used. These and other variations, modifications, and alternatives will be apparent by one of ordinary skill in the art. Further details of methods according to embodiments of the present invention can be found throughout the present specification and more particularly below.

A method according to an embodiment of the present invention can be provided as follows.

1. Select desired input output coupling between a pair of fibers from user interface device;
2. Transfer instructions from the user interfaces device to controller, which oversees operation of an optical switching system;
3. Instruct processing device to initiate sequence for switching an optical path from a first path to a second path;
4. Move a set of mirrors relative to each other to switch the optical path from the first path to the second path;
5. Capture an analog signal indicative of a spatial position of a first mirror using a position sensing device coupled to the mirror;
6. Converting the signal analog signal into a digital signal;
7. Process the digital signal indicative of the spatial position of the mirror using the digital signal processing device to obtain a characteristic of the mirror;
8. Provide a control signal based upon the characteristic of the mirror;
9. Convert the control signal into an analog control signal; and
10. Use the analog control signal with the actuation assembly to set a desired position of the first mirror;
11. Perform the above sequence of steps for the second mirror in the set of mirrors; and
12. Perform other steps, as desired.

The above sequence of steps is provided to create a transparent switching method for the user. In an exemplary embodiment, the user merely selects an optical path. The system performs with switching from a first path to a second path and controls the mirror without any user interaction. Here, the system controls any variations that may be caused by aging, vibrations, temperature variations, pressure variations, variations and other processing parameters and the like, which often cause non-ideal switching conditions. Such non-ideal switching conditions influence the optical path. The present invention, which includes a method and computer system, provides a way of controlling a mirror device using active feed back control for optimizing the optical path under these non-ideal conditions. These and other details of the invention are provided throughout the present specification and more particularly below.

Figure 7:
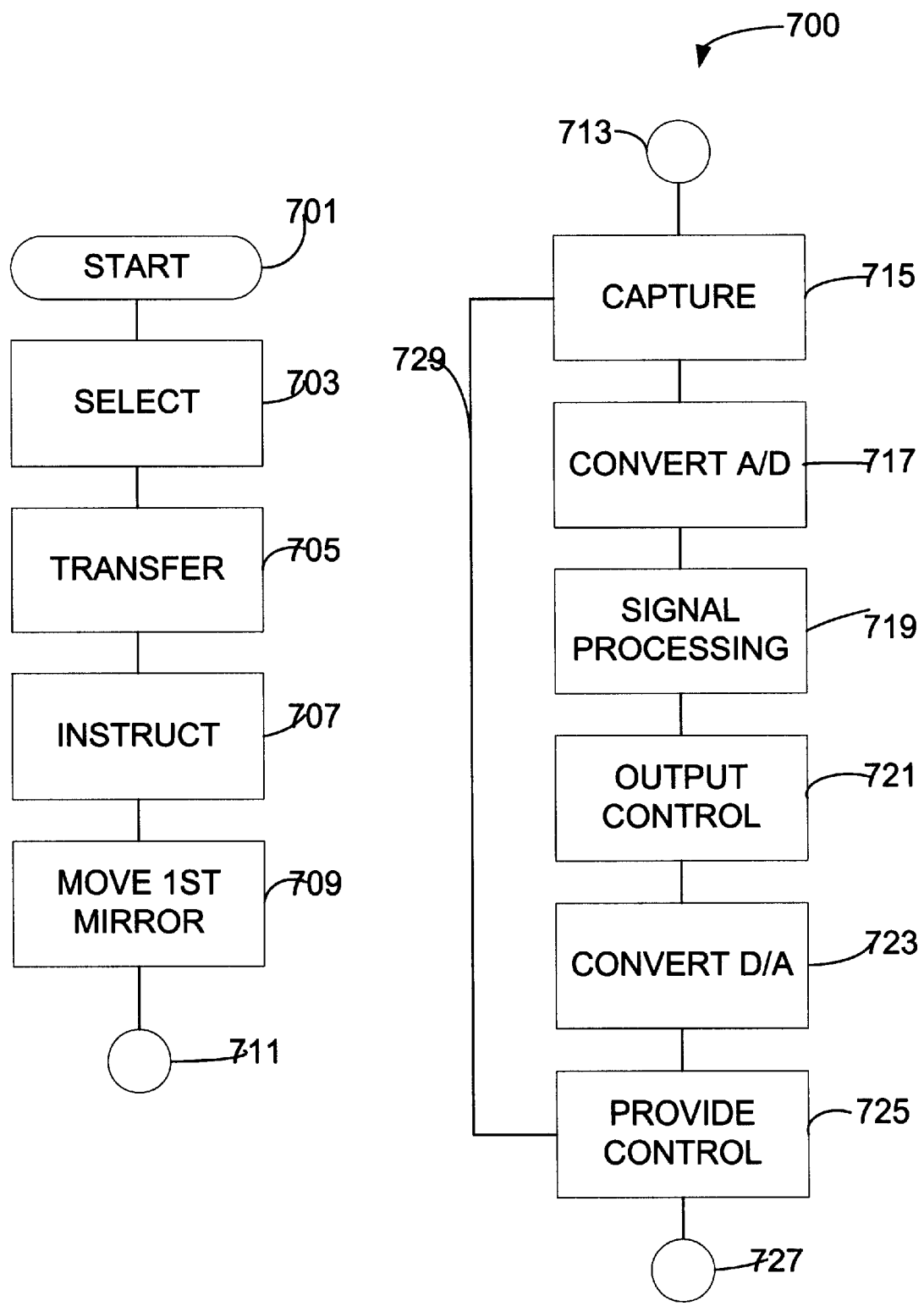
FIGS. 7 to 8 are simplified diagrams illustrating methods according to embodiments of the present invention.

Referring to FIG. 7, the present invention has a method 700 that begins at start, step 701. The method includes selecting (step 703) a desired input output coupling between a pair of fibers from user interface device. The user interface device can include a graphical user interface coupled to a client device. The client device is often a computer or workstation, but can be other devices. As merely an example, the client device is illustrated by FIG. 9, which is not intended to be limiting.

Figure 9:
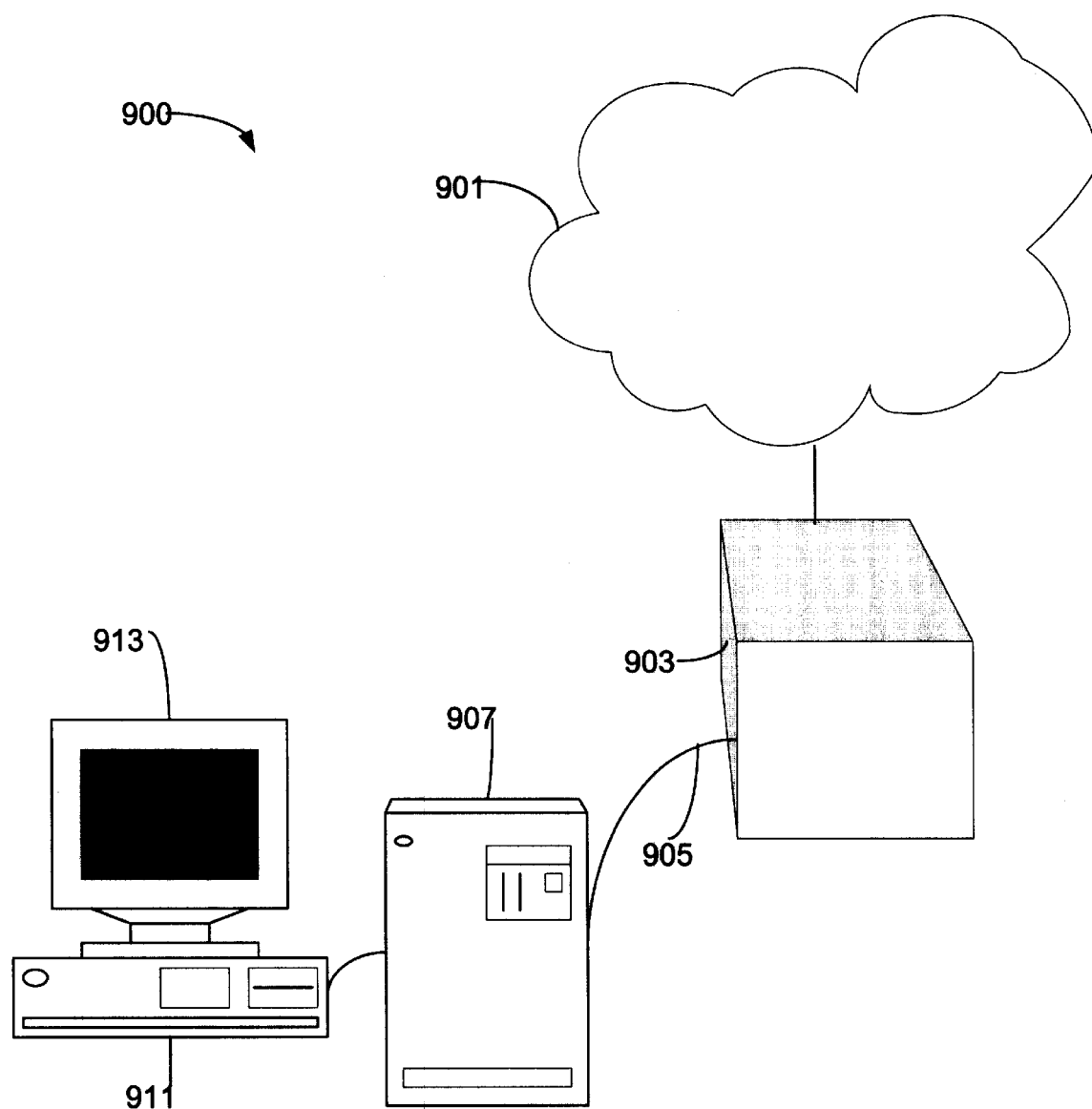
FIG. 9 is a simplified diagram of a client device coupled to an optical network according to an embodiment of the present invention

FIG. 9 is a simplified diagram 900 of a client device 913 coupled to a switching network 901, which is illustrated by the cloud. The switching network includes a variety of optical switching systems include switching system 903. Such switching system is a mirror-based switch such as the one described above but can be others. The switching system coupled through line 905 to controller device 907, which can be computer or the like. The controller device couples to the client device 911, which includes display 913. The client device also includes a keyboard, mouse, and other features for input of information. The client device is used to switch a light beam or the like from a first path to a second path. Details of such switching process and control of such process are provided in more detail below.

The method then transfers (step 705) instructions from the user interfaces device to controller, which oversees operation of an optical switching system. The method then instructs (step 707) a processing device through a controller to initiate sequence for switching an optical path from a first path to a second path. The controller can be any suitable device including inputs and outputs coupled to a processing device. Next, the method through the processing device moves a set of mirrors relative to each other to switch the optical path from the first path to the second path. In a specific embodiment, the method moves a first mirror (step 709), which receives an input beam from an input fiber, which is often coupled to a fiber bundle. The mirror can be the one described above but can also be others. The processing device can be a digital signal processing device, a micro-processing device, and others. As the mirror moves from a first position to a second position or is maintained at its selected position, the method uses a feed back process to control a spatial position of the mirror, as shown by the reference numerals 711, 713.

Here, the method captures (step 715) an analog signal indicative of a spatial position of a first mirror using a position-sensing device coupled to the mirror. The position-sensing device can be any one noted above and others. The method converts (step 717) the signal analog signal into a digital signal through an analog to digital converter for processing. The method processes (step 719) the digital signal indicative of the spatial position of the mirror using the digital signal-processing device to obtain a characteristic of the mirror. The characteristic can include a spatial characteristic such as position, as well as velocity, acceleration, and other parameters.

Based upon the characteristic, the method provides a control signal (step 721) to correct any deviations in the mirror position and/or other characteristics. The method converts (step 723) the control signal into an analog control signal through a digital to analog converter. The method then uses the analog control signal with the actuation assembly to set and control (step 725) a desired position of the first mirror or maintain a desired position of the mirror. The method continues to loop back through branch 729. Depending upon the embodiment, the method continues and performs the above sequence of steps for the second mirror in the set of mirrors. The method can also continue to perform other steps, step 727.

Figure 8:
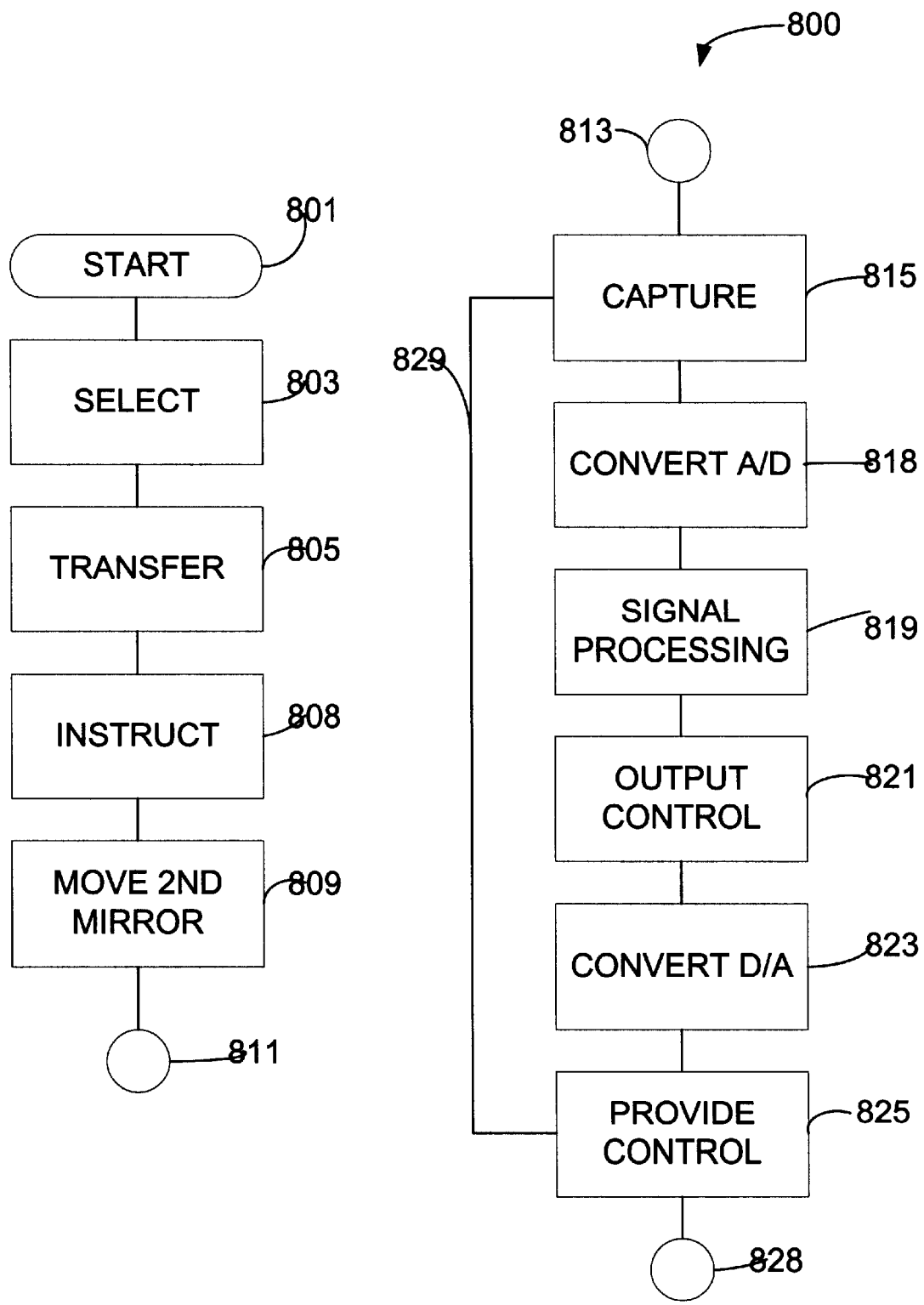

Referring to FIG. 8, the present invention has a method 800 that begins at start, step 801. The method includes selecting (step 803) a desired input output coupling between a pair of fibers from user interface device. The user interface device can include a graphical user interface coupled to a client device. The client device is often a computer or workstation, but can be other devices. As merely an example, the client device is illustrated by FIG. 9, which is not intended to be limiting.

The method then transfers (step 805) instructions from the user interfaces device to controller, which oversees operation of an optical switching system. The method then instructs (step 808) a processing device through a controller to initiate sequence for switching an optical path from a first path to a second path. Next, the method through the processing device moves a set of mirrors relative to each other to switch the optical path from the first path to the second path. In a specific embodiment, the method moves the second mirror (step 809), which receives an input beam from the first mirror and sends such beam into and output fiber, which is coupled to an output fiber bundle. The mirror can be the one described above but can also be others. The processing device can be a digital signal processing device, a micro-processing device, and others. As the mirror moves from a first position to a second position or is maintained at its selected position, the method uses a feed back process to control a spatial position of the mirror, as shown by the reference numerals 811, 813.

Here, the method captures (step 815) an analog signal indicative of a spatial position of a first mirror using a position-sensing device coupled to the mirror. The position-sensing device can be any one noted above and others. The method converts (step 818) the signal analog signal into a digital signal through an analog to digital converter for processing. The method processes (step 819) the digital signal indicative of the spatial position of the mirror using the digital signal-processing device to obtain a characteristic of the mirror. The characteristic can include a spatial characteristic such as position, as well as velocity, acceleration, and other parameters.

Based upon the characteristic, the method provides a control signal (step 821) to correct any deviations in the mirror position and/or other characteristics. The method converts (step 823) the control signal into an analog control signal through a digital to analog converter. The method then uses the analog control signal with the actuation assembly to set and control (step 825) a desired position of the first mirror or maintain a desired position of the mirror. The method continues to loop back through branch 829. Depending upon the embodiment, the method continues to other desired steps, step 828.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for switching signals using one of a plurality of mirrors in an array structure, the method comprising:
   determining an optical path to be formed between an input fiber and an output fiber;
   determining a set of mirrors to be used to form the optical path, the set of mirrors including at least a first mirror, the first mirror being coupled to a mechanical spring assembly, and an actuation assembly;
   capturing an analog signal indicative of a spatial position of the first mirror using a position sensing device, the sensing device being coupled to the mirror;
   converting the signal analog signal into a digital signal;
   processing the digital signal indicative of the spatial position of the mirror using the digital signal processing device to obtain a characteristic of the mirror; and
   providing a control signal based upon the characteristic of the mirror;
   converting the control signal into an analog control signal; and
   using the analog control signal with the actuation assembly to set a desired position of the first mirror.

2. The method of claim 1 wherein the characteristic comprises position information.

3. The method of claim 1 wherein the characteristic comprises position information including angular deflection, angular velocity, or angular velocity.

4. The method of claim 1 wherein the sensing device is selected from an optical device, an electrical device, a magnetic device, an electro-optic device, and a mechanical device.

5. The method of claim 1 wherein the set of mirrors includes the first mirror and a second mirror, the first mirror deflects an optical signal to the second mirror, the second mirror deflects the optical signal to the output fiber.

6. The method of claim 1 wherein the array comprises at least sixteen mirror devices.

7. The method of claim 1 wherein the mirror device has a spatial surface diameter of about 3 millimeters in size and less.

8. The method of claim 1 wherein the mirror is made of a silicon bearing material.

9. The method of claim 1 wherein the high density array is at least 64 devices.

10. The method of claim 1 wherein the mechanical spring is selected from a torsion bar assembly, a cantilever assembly, a hinged assembly, and a spring assembly.

11. The method of claim 1 wherein the determining is provided using a user interface device.

12. The method of claim 1 wherein the determining is provided using a user interface device coupled to a network.

13. A system for controlling and switching optical signals using selection of optical paths from a first fiber bundle to a second fiber bundle in a transparent manner, the system comprising:
   a client device including a graphical user interface for input of switching information by a user, the client device being substantially free from interaction by the user to optimize an optical path;
   a network coupled to the client device for receiving the switching information;
   a switch control apparatus coupled to the network and a switch device coupled to the switch control apparatus, the switch control device comprising:
      a fiber input device;
      a set of mirrors from a plurality of mirrors coupled to the fiber input device, the set of mirrors including at least a first mirror that is capable of being moved about a mechanical spring, the first mirror being coupled to the mechanical spring device to form a counter-acting force to the mirror in a first direction;
      a sensing device coupled to the first mirror, the sensing device being adapted to capture position information from the first mirror;
      an analog to digital converter device coupled to the sensing device, the digital to analog converter device being adapted to convert the position information into a digital signal;

a signal processing device coupled to the analog to digital converter, the digital signal processing device being adapted to process the digital signal to derive a digital control signal based upon a characteristic of the first mirror device;

a digital to analog converter device coupled to the signal processing device, the digital to analog converter device being adapted to convert the digital control signal to an analog control signal; and an actuation device coupled to the first mirror and coupled to the digital to analog converter, the actuation device receiving a signal derived from the analog control signal to drive the mirror about the mechanical spring using the analog control signal to set a desired position of the first mirror.

14. The system of claim 1 wherein the characteristic comprises position information.

15. The system of claim 1 wherein the characteristic comprises position information including angular deflection, angular velocity, or angular velocity.

16. The system of claim 1 wherein the sensing device is selected from an optical device, an electrical device, a magnetic device, an electro-optic device, and a mechanical device.

17. The system of claim 1 wherein the set of mirrors includes the first mirror and a second mirror, the first mirror deflects an optical signal to the second mirror.

* * * * *